US008823638B2

(12) United States Patent
Chen

(10) Patent No.: US 8,823,638 B2
(45) Date of Patent: Sep. 2, 2014

(54) OPTICAL NAVIGATION MODULE WITH ALIGNMENT FEATURES

(75) Inventor: Chao Chen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 358 days.

(21) Appl. No.: 13/025,315

(22) Filed: Feb. 11, 2011

(65) Prior Publication Data

US 2012/0206329 A1 Aug. 16, 2012

(51) Int. Cl.
*G09G 5/00* (2006.01)
*G06F 3/03* (2006.01)
*G06F 3/0354* (2013.01)

(52) U.S. Cl.
CPC ............ *G06F 3/0354* (2013.01); *G06F 3/0304* (2013.01)
USPC ........ 345/156; 345/157; 345/166; 361/679.1; 361/679.18

(58) Field of Classification Search
USPC ............. 379/368; 341/20; 361/679.1, 679.18; 345/156, 157, 166, 167, 173, 175; 178/18.01–18.11
See application file for complete search history.

(56) References Cited

U.S. PATENT DOCUMENTS

| | | | |
|---|---|---|---|
| 5,367,135 A | 11/1994 | Selby | |
| 5,619,195 A * | 4/1997 | Allen et al. | 341/20 |
| 5,739,486 A | 4/1998 | Buckingham | |
| 5,819,914 A | 10/1998 | Yoneyama | |
| 5,887,704 A | 3/1999 | Schorpp | |
| 6,166,370 A * | 12/2000 | Sayag | 250/221 |
| 6,281,887 B1 * | 8/2001 | Wang | 345/173 |
| 7,067,754 B2 | 6/2006 | Weston | |
| 2001/0048424 A1 * | 12/2001 | Lu | 345/161 |
| 2002/0061735 A1 * | 5/2002 | Wingett et al. | 455/90 |
| 2003/0034959 A1 * | 2/2003 | Davis et al. | 345/166 |
| 2007/0115263 A1 * | 5/2007 | Taylor et al. | 345/169 |
| 2010/0066672 A1 | 3/2010 | Schoolcraft | |
| 2010/0079404 A1 * | 4/2010 | Degner et al. | 345/174 |

FOREIGN PATENT DOCUMENTS

DE 10317542 A1 * 8/2004

OTHER PUBLICATIONS

Haler H-U8W—Chinese WM Communicator middle class [http://phonestechnology.blogspot.com/2009/12/haier-h-u8w-chinese-wm-communicator.html] Retrieved Dec. 25, 2009. pp. 1-4.
Extended European Search mailed Jul. 21, 2011. In corresponding application No. 11154134.8.
Cho, W-S et al. Flexible Tactile Sensor Fabricated using Polymer Membrane. 5th IEEE Conference on Sensors, 2006, Daegu, Korea, Oct. 22-25, 2006. pp. 730-733 [online], [retrieved on Oct. 16, 2013]. Retrieved from the Internet <URL: http://ieeexplore.ieee.org/stamp/stamp.jsp?tp=&arn um ber=4178724.

(Continued)

*Primary Examiner* — Koosha Sharifi-Tafreshi
(74) *Attorney, Agent, or Firm* — Novak Druce Connolly Bove + Quigg LLP

(57) ABSTRACT

An optical navigation module comprising a rigid flange having a top surface. An optical navigation unit can be coupled to the top surface of the rigid flange with an electrical connection electrically coupled to the optical navigation unit. An alignment flange can be coupled to the rigid flange with the alignment feature including one or more alignment features. The alignment feature can be a hole adapted to receive an alignment pin to hold and align the optical navigation module.

21 Claims, 4 Drawing Sheets

B-B

(56) References Cited

OTHER PUBLICATIONS

Fuh, Y-K et al. Micromachined W-Band Plastic Slot Array Antenna with Self-Aligned and Integrated Flange. Solid-State Sensors, Actuators and Microsystems Conference, Transducers 2009, Denver, CO, Jun. 21-25, 2009. pp. 2122-2125 [online], [retrieved on Oct. 16, 2013]. Retrieved from the Internet <URL:http://ieeexplore.ieee.org/stamp/stamp.jsp?tp=&arnumber=5285625.

Office Action mailed Oct. 28, 2013, in corresponding Canadian patent application No. 2,764,979.

* cited by examiner

A-A

B-B

OPTICAL NAVIGATION MODULE WITH ALIGNMENT FEATURES

FIELD

The present disclosure relates to mobile devices, and more specifically to an optical navigation module with alignment features for a mobile device.

BACKGROUND

Mobile devices are becoming more prevalent and more advanced. Mobile devices can include, but are not limited to, cellular telephones, smart telephones, wireless personal digital assistants (PDAs), and laptop computers with wireless 802.11 or Bluetooth capabilities. These devices can run on a wide variety of networks from data-only networks such as Mobitex® and DataTAC® networks to complex voice and data networks such as GSM/GPRS, CDMA, EDGE, UMTS and CDMA2000 networks. As the technology associated with mobile devices continues to advance, users of these mobile devices are becoming more reliant on these mobile devices. Technology advances are being made with respect to navigation tools. For example, many conventional mobile devices used track wheels to navigate items displayed on the display of the mobile device. At one point, track balls or navigation pads were incorporated into these devices. Currently, optical navigation tools, such as optical navigation pads and optical jog balls, are becoming popular. Conventional optical navigation tools can use an electrical connector to communicatively couple an optical navigation tool and a processor to control navigation among items displayed on the display screen of the mobile device. Due to imprecision in the length of these electrical connectors, some optical navigation tools are not properly aligned after fabrication. Specifically, due to the imprecision in the length of the electrical connector, the optical navigation tool can be tilted or angled towards one of the sides of the mobile device. For example, in the event the electrical connector is longer than desired, the side of the optical navigation tool having the coupled electrical connector can be higher than the opposite side of the optical navigation tool. Conversely, in the event the electrical connector is shorter than desired, the side of the optical navigation tool having the coupled electrical connector can be lower than the opposite side of the optical navigation tool. For some mobile devices, the tactile feel for the optical navigation tool is poor due to improper support in the z-direction or z-axis.

BRIEF DESCRIPTION OF THE DRAWINGS

Implementations of the present disclosure will now be described, by way of example only, with reference to the attached Figures, wherein.

DETAILED DESCRIPTION

Figure 1:
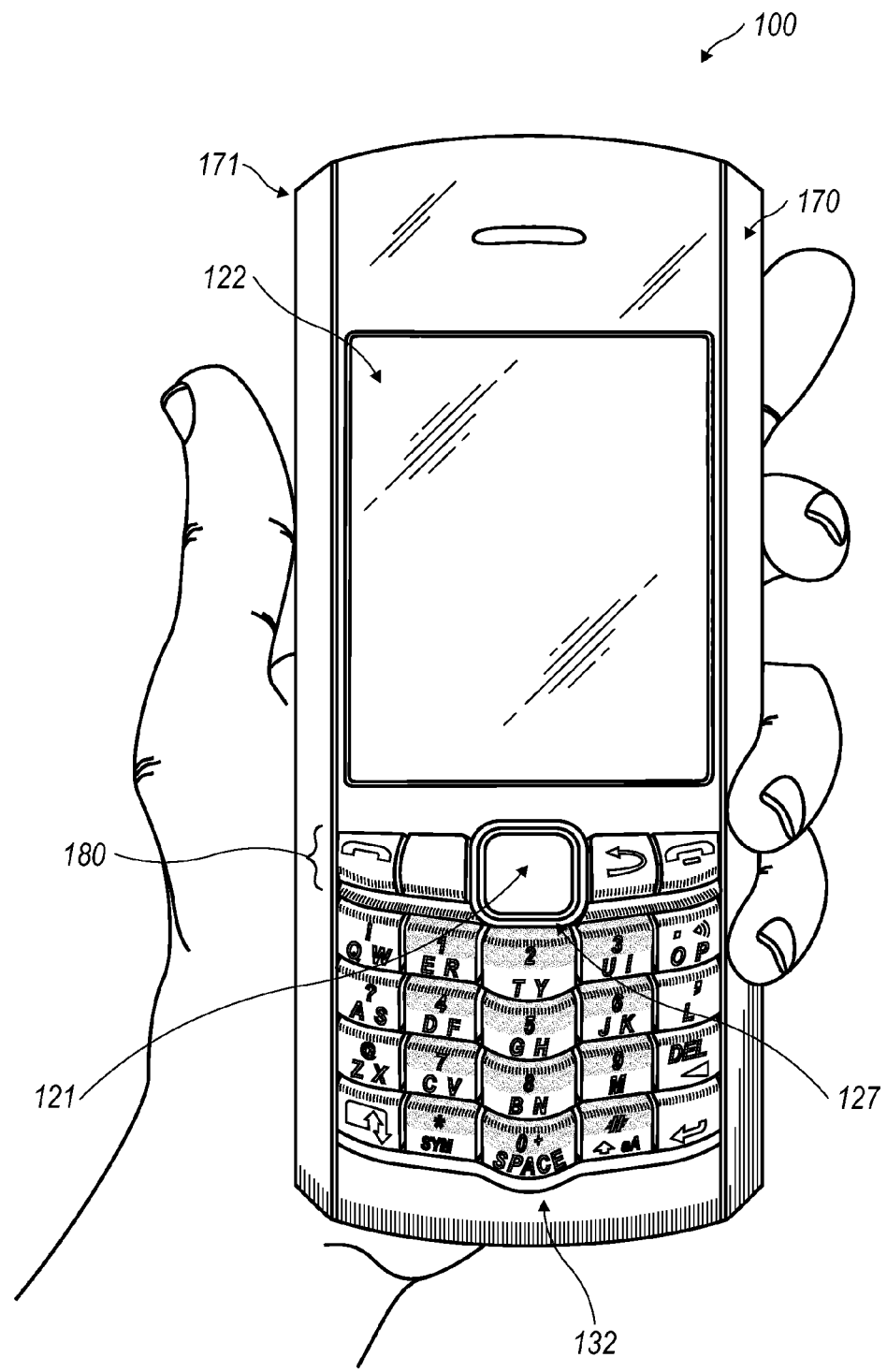
FIG. 1 is a front view of a mobile device having an optical navigation tool in accordance with an exemplary implementation.

As will be appreciated for simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The word "coupled" is defined as connected, whether directly or indirectly through intervening components, and is not necessarily limited to physical connections. The term "communicatively coupled" is defined as connected, whether directly or indirectly through intervening components, is not necessarily limited to a physical connection, and allows for the transfer of data. The term "mobile device" is defined as any electronic device that is capable of at least accepting information entries from a user and includes the device's own power source. A "wireless communication" means communication that occurs without wires using electromagnetic radiation. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies.

The present disclosure describes an optical navigation module with alignment features for a mobile device. The optical navigation module can include a rigid flange having a top surface. An optical navigation unit can be coupled to the top surface of the rigid flange with an electrical connector electrically coupled to the optical navigation unit. An alignment flange can be coupled to the rigid flange with the alignment feature including one or more alignment features. The alignment feature can be a hole adapted to receive an alignment pin to hold and align the optical navigation module. By using the alignment features, the optical navigation module can reduce tilting caused by imprecision in the length of the electrical connector. In addition, the optical navigation module can provide support in the z-direction or z-axis which can result in improved tactile feel for the optical navigation module.

Referring to FIG. 1, a front view of a mobile device in accordance with an exemplary implementation is illustrated. As shown, the mobile device 100 can have a reduced QWERTY keyboard 132. Each key of the keyboard 132 can be associated with at least one indicia representing an alphabetic character, a numeral, or a command (such as a space command, return command, or the like). The plurality of the keys having alphabetic characters can be arranged in a standard keyboard layout. This standard keyboard layout can be a QWERTY layout (as shown in FIG. 1), a QZERTY layout, a QWERTZ layout, an AZERTY layout, a Dvorak layout, a Russian keyboard layout, a Chinese keyboard layout, or other similar layout. These standard layouts are provided by way of example and other similar standard layouts are considered within the scope of this disclosure. The keyboard layout can be based on the geographical region in which the handheld device is intended for sale. In some examples, the keyboard can be interchangeable such that the user can switch between layouts. In other examples, the keyboard is a virtual keyboard provided on a touch screen display (not shown).

Figure 2:
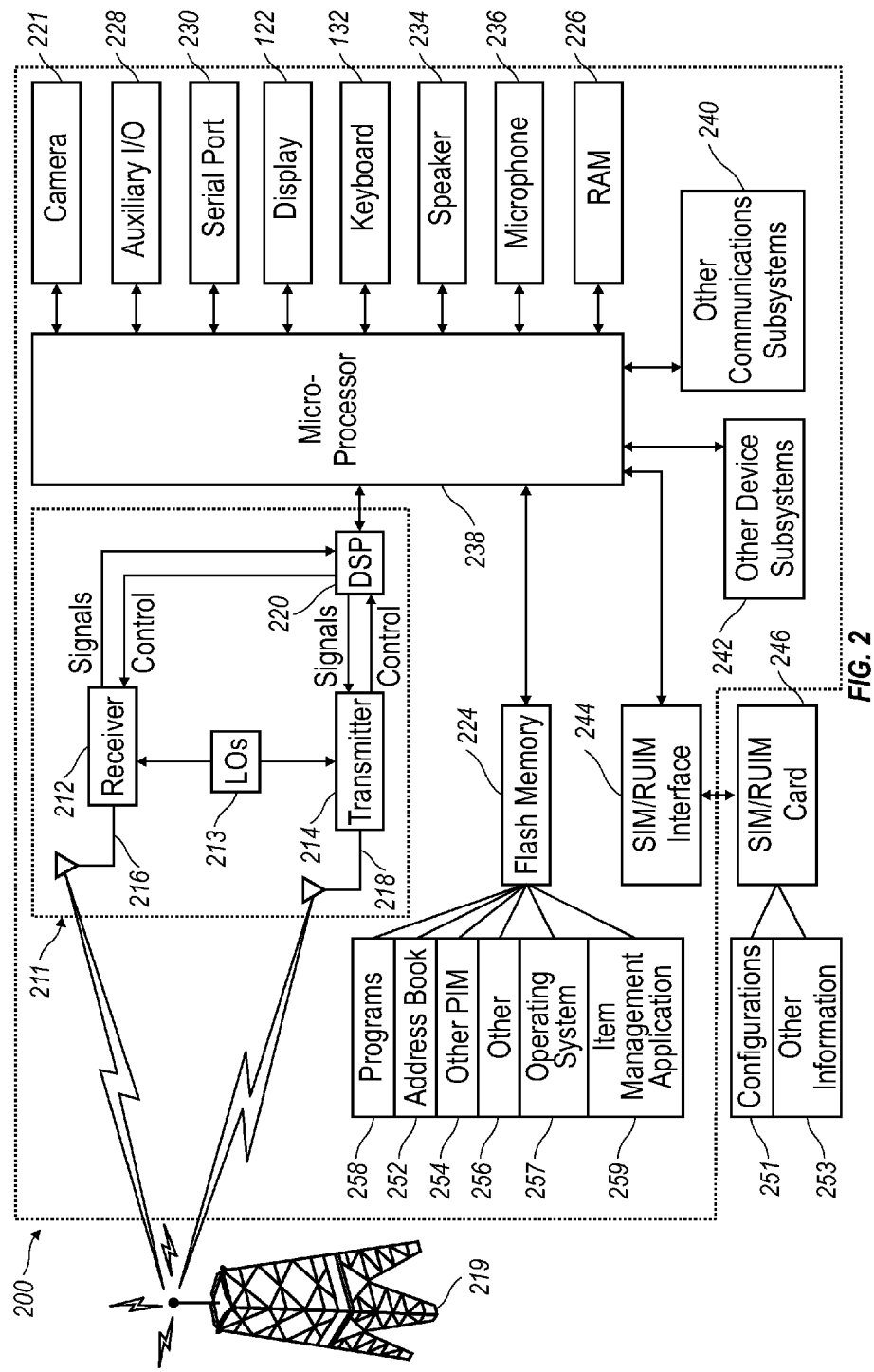
FIG. 2 is a block diagram of a mobile device in a communication network in accordance with an exemplary implementation.

As shown, the exemplary mobile device 100 can be communicatively coupled to a wireless network 219 as exemplified in the block diagram of FIG. 2. These figures are exemplary only, and those persons skilled in the art will appreciate that additional elements and modifications may be necessary to make the mobile device 100 work in particular network environments. While in the illustrated embodiment, the mobile device 100 is a smart phone, however, in other embodiments, the mobile device 100 can be a personal digital assistant (PDA), laptop computer, desktop computer, tablet computer, server, or other mobile device capable of sending and receiving electronic messages.

As may be appreciated from FIG. 1, the mobile device 100 can have the lighted display 122 located above the keyboard 132 constituting a user input and suitable for accommodating textual input to the mobile device 100. The front face 170 of the mobile device 100 can have a navigation row 180. As shown, the mobile device 100 can be of a unibody construction, also known as a "candy-bar" design. In alternate embodiments, the mobile device 100 can be a "clamshell" or a "slider" design.

As described above, the mobile device 100 can include an auxiliary input that acts as a cursor navigation tool 127 and which can be also exteriorly located upon the front face 170 of the mobile device 100. The front face location of the navigation tool 127 can allow the navigation tool 127 to be easily thumb-actuable or finger-actuable like the keys of the keyboard 132. An embodiment provides the navigation tool 127 in the form of the optical navigation module 121 having one or more sensors, such as a capacitive sensor, optical sensor, or both, which can be utilized to instruct two-dimensional or three-dimensional screen cursor movement in substantially any direction, as well as act as an actuator when the optical navigation module 121 is depressed like a button. The placement of the navigation tool 127 may be above the keyboard 132 and below the display screen 122; here, it can avoid interference during keyboarding and does not block the operator's view of the display screen 122 during use, for example, as shown in FIG. 1.

The mobile device 100 can be configured to send and receive messages. The mobile device 100 includes a body 171 which can, in some embodiments, be configured to be held in one hand by an operator of the mobile device 100 during text entry. The display 122 is included which is located on the front face 170 of the body 171 and upon which information is displayed to the operator during text entry. The mobile device 100 can also be configured to send and receive voice communications such as mobile telephone calls. The mobile device 100 can also include a camera to allow the user to take electronic photographs which can be referred to as photos or pictures.

Referring to FIG. 2, a block diagram of a mobile device in a communication network in accordance with an exemplary implementation is illustrated. As shown, the mobile device 100 can include a microprocessor 238 that controls the operation of the mobile device 100, such as facilitating communications, providing a graphical user interface, executing programs, and so forth. A communication subsystem 211 performs communication transmission and reception with the wireless network 219. The microprocessor 238 further can be coupled with an auxiliary input/output (I/O) subsystem 228. Additionally, in at least one implementation, the microprocessor 238 can be coupled to a serial port (for example, a Universal Serial Bus port) 230 that facilitates communication with other devices or systems via the serial port 230. A display 122 can be communicatively coupled to the microprocessor 238 to facilitate display of information to an operator of the mobile device 100. When the mobile device 100 is equipped with a keyboard 132, which can be physical or virtual (for example, displayed as images of keys rendered on a touch screen), the keyboard 132 can be communicatively coupled to the microprocessor 238. The mobile device 100 can include one or more speakers 234 and one or more microphones 236, which can advantageously be communicatively coupled to the microprocessor 238 and are discussed in further detail below. Other communication subsystems 240 and other mobile device subsystems 242 are generally indicated as communicatively coupled with the microprocessor 238. An example of a communication subsystem 240 is a short-range communication system such as a BLUETOOTH® communication module or a WI-FI® communication module (a communication module in compliance with IEEE 802.11b, g or n) and associated circuits and components. Additionally, the microprocessor 238 can perform operating system functions and executes programs or software applications on the mobile device 100. In some implementations, not all of the above components are included in the mobile device 100. The auxiliary I/O subsystem 228 can take the form of one or more different navigation tools (multi-directional or single-directional), external I/O devices such as keyboards, and other subsystems capable of providing input or receiving output from the mobile device 100.

Figure 3:
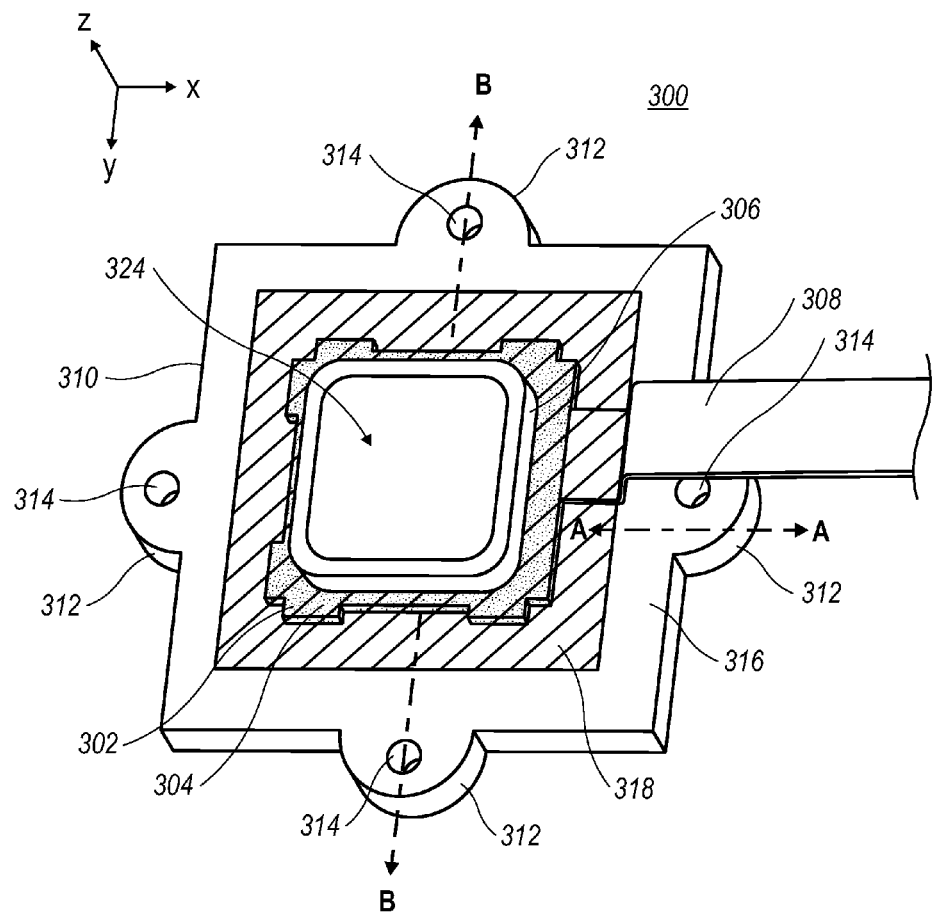
FIG. 3 is a perspective view of an optical navigation module for a mobile device in accordance with an exemplary implementation.
Figure 4:
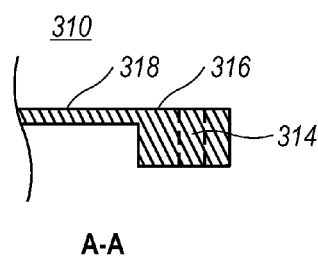
FIG. 4 is a cross section view of an alignment flange in accordance with an exemplary implementation.
Figure 5:
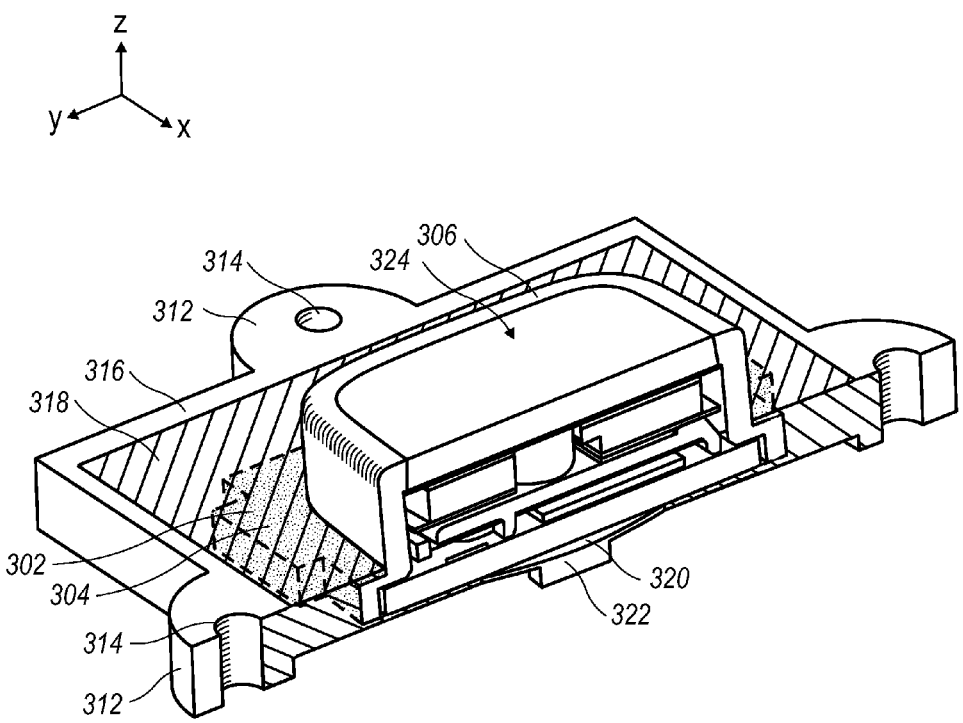
FIG. 5 is a cross section of an optical navigation module for a mobile device in accordance with an exemplary implementation.

The auxiliary I/O subsystem 228 can take the form of a variety of different navigation tools 127 (multi-directional or single-directional) such as an optical navigation module or tool 121 as illustrated in the exemplary embodiment shown in FIG. 1 and shown in more detail in FIGS. 3-5. In other embodiments, a trackball, a thumbwheel, a navigation pad, a joystick, a touch-sensitive interface, or other I/O interface can be used. The navigation tool 127 can be located on a front surface 170 of the mobile device 100 or may be located on any exterior surface of the mobile device 100. Other auxiliary I/O subsystems can include external display devices and externally connected keyboards (not shown). While the above examples have been provided in relation to the auxiliary I/O subsystem 228, other subsystems capable of providing input or receiving output from the mobile device 100 are considered within the scope of this disclosure. Additionally, other keys may be placed along the side of the mobile device 100 to function as escape keys, volume control keys, scrolling keys, power switches, or user programmable keys, and may likewise be programmed accordingly.

The mobile device 100 can be equipped with components to enable operation of various programs, as shown in FIG. 2. As shown, the memory 224 can provide storage for the operating system 257, device programs 258, data, and so forth. The operating system 257 can be generally configured to manage other programs 258 that are also stored in memory 224 and executable on the processor 238. The operating system 257 can handle requests for services made by programs 258 through predefined program interfaces. More specifically, the operating system 257 can typically determine the order in which multiple programs 258 are executed on the processor 238 and the execution time allotted for each program 258, manages the sharing of memory 224 among multiple programs 258, handles input and output to and from other device subsystems 242, and so forth. In addition, operators can interact directly with the operating system 257 through a user interface, typically including the keyboard 132 and display screen 122. The operating system 257, programs 258, data, and other information can be stored in memory 224, RAM 226, read-only memory (ROM), or another suitable storage element (not shown). An address book 252, personal information manager (PIM) 254, and other information 256 can also be stored.

The mobile device 100 can be enabled for two-way communication within voice, data, or voice and data communication systems. A Subscriber Identity Module (SIM) or Removable User Identity Module (RUIM) can be utilized to authorize communication with the communication network 219. A SIM/RUIM interface 244 within the mobile device 100 can interface a SIM/RUIM card 246 to the microprocessor 238 and can facilitate removal or insertion of a SIM/RUIM card 246. The SIM/RUIM card 246 features memory and can hold key configurations 251, and other information 253 such as identification and subscriber related information. The mobile device 100 can be equipped with an antenna 218 for transmitting signals to the communication network 219 and another antenna 216 for receiving communication from the communication network 219. Alternatively, a single antenna (not shown) can be utilized to both transmit and receive signals. A communication subsystem 211 can include a transmitter 214 and receiver 212, one or more antennae 216, 218, local oscillators (LOs) 213, and a processing module 220 such as a digital signal processor (DSP) 220.

The mobile device 100 can include a touch-sensitive display or touchscreen that includes one or more touch location sensors, an overlay, and a display 122, such as a liquid crystal display (LCD) or light emitting diode (LED) display. The touch location sensor(s) can be a capacitive, resistive, infrared, surface acoustic wave (SAW), or other type of touch-sensitive sensor and can be integrated into the overlay. The overlay, or cover, can be comprised of laminated glass, plastic, or other suitable material(s) and is advantageously translucent or transparent. A touch, or touch contact, can be detected by the touchscreen and processed by the processor 238, for example, to determine a location of the touch. Touch location data can include the center of the area of contact or the entire area of contact for further processing. A touch may be detected from a contact member, such as a body part of a user, for example a finger or thumb, or other objects, for example a stylus, pen, or other pointer, depending on the nature of the touch location sensor.

Referring to FIG. 3, a top perspective view of an optical navigation module in accordance with an exemplary implementation is illustrated. As shown, the optical navigation module 300 can include a rigid flange 302 having a top surface 304. The rigid flange 302 can be substantially square in shape. The rigid flange 302 can be made of a material that provides support in the z-direction. For example, the rigid flange 302 can be made of plastic or metal. The optical navigation module 300 can include an optical navigation unit 306 coupled to the top surface of the rigid flange. The housing of the rigid flange 302 and the housing of the optical navigation unit 306 can be co-molded from the same molding part. The optical navigation unit 306 can be substantially square in shape. The optical navigation unit 306 can provide navigation in two or three directions or axis, such as the x-direction (or x-axis), y-direction (or y-axis), and z-direction (or z-axis). The optical navigation unit 306 can include an optical navigation tool, such as an optical navigation pad or an optical jog ball. Alternatively, other navigation units can be used in place of the optical navigation unit 306, such as a navigation pad or jog ball. The optical navigation module 300 can include an electrical connector 308 for communicatively coupling the optical navigation unit 306 to the processor 238. For example, a flexible printed circuit (FPC) 308 can communicatively couple the optical navigation unit 306 to the processor 238. The optical navigation unit 306 can provide user inputs to the processor 238 which can allow a user to navigate among items displayed on the display 122 of the mobile device 100, select an item displayed on the display 122 of the mobile device, or both.

The optical navigation module 300 can include an alignment flange 310. The alignment flange 310 can be substantially square in shape. The alignment flange 310 can hold and align the optical navigation module 300 in the x-direction (or x-axis) and y-direction (or y-axis) once assembled in a mobile device 100. The alignment flange 310 can include or form one or more alignment features 312. As shown, the alignment flange 310 can form one or more holes 314 with each hole 314 adapted to receive an alignment pin (not shown) or other suitable alignment component. For example, alignment pins can extend from a front housing, a rear housing, or from a keypad assembly. One or more of the alignment pins can extend partially through or entirely through the holes 314. Alternatively, the one or more alignment features 312 can be alignment pins extending from the alignment flange 310 and can extend partially through or entirely through one or more holes in another component, such as a front housing, circuit board or keypad assembly. Although, holes and pins are described as exemplary alignment features 312, other alignment features can be implemented.

Referring to FIG. 4, a cross-sectional view of the alignment flange in accordance with an exemplary embodiment is illustrated. As shown, the alignment flange 310 can comprise a thick outer portion 316 and a thin center portion 318 with the thick portion 316 being thicker than the thin portion 318. The outer portion 316 and the center portion 318 can be co-molded from the same material. The alignment flange 310 can be substantially square in shape. The outer portion 316 can partially or fully surround the center portion 318. The center portion 318 can be substantially square in shape. The center portion 318 can be co-molded with the rigid flange 302. The center portion 318 can partially or fully encase or envelope the rigid flange 302. The alignment flange 310 can be pre-loaded such that the outer portion 316 is thicker than the center portion 318 with a top surface 324 of the optical navigation unit 306 being below the height of the thick portion 316 prior to assembly; however, due to compression of the outer portion 316 during assembly, the top surface 324 of the optical navigation unit 306 can be higher than the outer portion 316 after assembly. By preloading the alignment flange 310, the optical navigation module 300 can provide improved tactile feel.

Referring again to FIG. 3, the one or more alignment features 312 can be formed in the outer portion 316. By forming each alignment feature 312 in the thick outer portion 316, the outer portion 316 can provide improved support compared to an alignment feature 312 formed in the thinner center portion 318. In addition, there can be reduced risk of damage to the alignment feature 312 due to the thickness of the outer portion 316. Each alignment feature 312 can extend from a side of the outer portion 316. The thin center portion 318 can deflect in response to pressure being applied to the optical navigation unit 306.

The alignment flange 310 can be made of rubber or other suitable material and can assist in preventing foreign material, such as dust or water, from entering the mobile device 100 via the optical navigation module 300 which can extend out of an opening of a front housing (not shown) of the mobile device 100. The outer portion 316 can be compressed by, for example, the rigid flange 302 and the front housing once assembled.

Referring to FIG. 5, a cross-sectional view of the optical navigation module in accordance with an exemplary implementation is illustrated. As shown, the optical navigation module 300 can include a dome overlay 320 on the underside of the optical navigation module 300. The overlay 320 can be rubber and can partially or fully cover the underside of the alignment flange 310. A metal layer (not shown) can be interposed between the alignment flange 310 and the overlay 320 to provide additional support in the z-direction or z-axis for the optical navigation module 300. The overlay 320 can be co-molded with the thin center portion 318 of the alignment flange 310.

In one or more embodiments, a dome actuator 322 can be coupled to the underside of the optical navigation module 300. For example, the actuator 322 can be coupled to the overlay 320. The actuator 322 can provide an input in response to an application of pressure to the top surface 324 of the optical navigation unit 306. The actuator 322 can be a soft or rigid or semi-rigid material and can have a cylindrical or semi-cylindrical shape. The actuator 322 can be attached to the overlay 320 utilizing glue or other suitable material.

The dome overlay 320 and dome actuator 322 can be attached to one another. If the dome actuator 322 is configured to be lower in the Z axis than the bottom surface of the outer portion 316 of the alignment flange 310, the thin center portion 318 can be stretched by the difference between the heights of the bottom of the alignment flange 310 and the dome actuator 322 and a pressure force can be imposed upon the dome actuator 322. The imposed force can enhance the connectivity between the actuator 322 and the surface beneath the actuator 322, which can enhance the tactile feel of the navigation unit 306.

The present disclosure may be embodied in other specific forms without departing from its spirit or essential characteristics. The described implementations are to be conportioned in all respects only as illustrative and not restrictive. The scope of the disclosure is, therefore, indicated by the appended claims rather than by the foregoing description. All changes that come within the meaning and range of equivalency of the claims are to be embraced within their scope.

The invention claimed is:

1. An optical navigation module, comprising:
    a rigid flange having a top surface;
    an optical navigation unit coupled to the top surface of the rigid flange, the optical navigation unit including a contact surface and being configured to detect direct contact of the contact surface by an external object;
    an electrical connection electrically coupled to the optical navigation unit; and
    an alignment flange coupled to the rigid flange, the alignment flange including:
        a center portion;
        an outer portion that surrounds the center portion, the outer portion having a thicker dimension than the center portion, the center portion being configured to deflect to provide an actuation force and generate an electrical signal in response to pressure applied to the optical navigation unit; and
        at least one alignment feature.

2. The optical navigation module of claim 1, wherein the rigid flange is plastic.

3. The optical navigation module of claim 1, wherein the rigid flange is configured to support the optical navigation module, the rigid flange being configured to deflect with the alignment flange to provide the actuation force when pressure is applied to the optical navigation unit.

4. The optical navigation module of claim 1, wherein the optical navigation unit is one of an optical navigation pad and an optical jog ball.

5. The optical navigation module of claim 1, wherein the electrical connection is a flexible printed circuit.

6. The optical navigation module of claim 1, wherein the alignment flange aligns the optical navigation module in an x-direction and a y-direction when assembled in a communication device.

7. The optical navigation module of claim 1, wherein the alignment flange forms at least one alignment feature adapted to receive an alignment post.

8. The optical navigation module of claim 1, wherein each alignment feature is formed on the outer portion.

9. The optical navigation module of claim 1, wherein the alignment flange is pre-loaded by providing a different thickness at the center portion relative to the outer portion.

10. A communication device comprising:
    a display;
    an optical navigation module, comprising
        a rigid flange having a top surface;
        an optical navigation unit coupled to the top surface of the rigid flange, the optical navigation unit including a contact surface and being configured to detect direct contact of the contact surface by an external object;
        an electrical connection electrically coupled to the optical navigation unit; and
        an alignment flange coupled to the rigid flange, the alignment flange including:
            a center portion;
            an outer portion that surrounds the center portion, the outer portion having a thicker dimension than the center portion, the center portion being configured to deflect to provide an actuation force and generate an electrical signal in response to pressure applied to the optical navigation unit; and
            at least one alignment feature; and
    a processor communicatively coupled to the display and the optical navigation module via the electrical connection, the processor being configured to cause navigation of the display in response to detecting the direct contact of the contact surface by the external object.

11. The communication device of claim 10, wherein the rigid flange is plastic.

12. The communication device of claim 10, wherein the rigid flange is configured to support the optical navigation module, the rigid flange being configured to deflect with the alignment flange to provide the actuation force when pressure is applied to the optical navigation unit.

13. The communication device of claim 10, wherein the optical navigation unit is one of an optical navigation pad and an optical jog ball.

14. The communication device of claim 10, wherein the electrical connection is a flexible printed circuit.

15. The communication device of claim 10, wherein the alignment flange aligns the optical navigation module in an x-direction and a y-direction when assembled in the communication device.

16. The communication device of claim 10, wherein the alignment flange forms at least one alignment feature adapted to receive an alignment post.

17. The communication device of claim 10, wherein each alignment feature is formed on the outer portion.

18. The communication device of claim 10, wherein the alignment flange is pre-loaded by providing a different thickness at the center portion relative to the outer portion.

19. The optical navigation module of claim 6, wherein, when assembled in the communication device, the optical navigation unit is positioned on a front face of the communication device adjacent to a keyboard, the keyboard being positioned on the front face and configured for contact by the external object.

20. The communication device of claim 10, wherein the display and the optical navigation unit are positioned on a front face of the communication device, the optical navigation unit being positioned adjacent to the display.

21. The communication device of claim 10 further comprising:
   a keyboard positioned on a front face of the communication device for contact by the external object, the display and the optical navigation unit being positioned on the front face, the optical navigation unit being positioned adjacent to the keyboard and the display.

* * * * *